United States Patent
Danilov et al.

(10) Patent No.: US 10,853,237 B2
(45) Date of Patent: *Dec. 1, 2020

(54) WRITE CACHE SYSTEM AND METHOD FOR DATA CHUNK BYPASS AND ACKNOWLEDGMENT OF WRITE OF DATA CHUNK

(71) Applicant: EMC IP Holding Company LLC, Hopkinton, MA (US)

(72) Inventors: Mikhail Danilov, St. Petersburg (RU); Andrey Fomin, Vesevolozhsk (RU); Alexander Rakulenko, St. Petersburg (RU); Mikhail Malygin, St. Petersbrug (RU); Chen Wang, Shanghai (CN)

(73) Assignee: EMC IP Holding Company, LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/220,941

(22) Filed: Dec. 14, 2018

(65) Prior Publication Data

US 2019/0121729 A1    Apr. 25, 2019

Related U.S. Application Data

(63) Continuation of application No. 15/398,979, filed on Jan. 5, 2017, now Pat. No. 10,157,125.

(30) Foreign Application Priority Data

Mar. 31, 2016    (RU) ............................... 2016112119

(51) Int. Cl.
G06F 12/02    (2006.01)
G06F 3/06    (2006.01)

(52) U.S. Cl.
CPC ............ *G06F 12/0246* (2013.01); *G06F 3/06* (2013.01); *G06F 3/061* (2013.01); *G06F 3/0656* (2013.01);
(Continued)

(58) Field of Classification Search
CPC .... G06F 12/0246; G06F 3/0656; G06F 3/061; G06F 3/0689; G06F 3/06;
(Continued)

(56) References Cited

U.S. PATENT DOCUMENTS 10,157,125 B2 * 12/2018 Danilov .................... G06F 3/06
2012/0089781 A1   4/2012 Ranade et al.
(Continued)

OTHER PUBLICATIONS

Non-Final Office Action issued in related U.S. Appl. No. 15/398,979 dated Jun. 15, 2018.
(Continued)

*Primary Examiner* — Hong C Kim
(74) *Attorney, Agent, or Firm* — Brian J. Colandreo; Mark H. Whittenberger; Holland & Knight LLP

(57) ABSTRACT

A method, computer program product, and computer system for receiving, at a first computing device, a first data chunk sent from a second computing device. It may be determined that the first data chunk includes a first type of data. The first data chunk may be stored to a cache operatively coupled to the first computing device based upon, at least in part, determining that the first data chunk includes the first type of data, wherein the cache may include a first storage device type. An acknowledgement of a successful write of the first data chunk to the second computing device may be sent based upon, at least in part, a successful storing of the first data chunk to the cache operatively coupled to the first computing device.

20 Claims, 8 Drawing Sheets

(52) U.S. Cl.
CPC ...... G06F 3/0689 (2013.01); *G06F 2212/222* (2013.01); *G06F 2212/7203* (2013.01); *G06F 2212/7207* (2013.01); *G06F 2212/7208* (2013.01)

(58) Field of Classification Search
CPC ....... G06F 2212/222; G06F 2212/7203; G06F 2212/7207; G06F 2212/7208
USPC ............... 711/133, 134, 135, 138, 126, 154; 709/217; 710/18
See application file for complete search history.

(56) References Cited

U.S. PATENT DOCUMENTS

| | | |
|---|---|---|
| 2015/0074351 A1 | 3/2015 | Avati et al. |
| 2015/0186276 A1 | 7/2015 | Lepak et al. |
| 2017/0286309 A1 | 10/2017 | Danilov et al. |
| 2018/0137898 A1* | 5/2018 | Bahramshahry ..... G11C 7/1072 |
| 2018/0165790 A1* | 6/2018 | Schneider ................ G06T 1/60 |

OTHER PUBLICATIONS

Notice of Allowance issued in related U.S. Appl. No. 15/398,979 dated Oct. 23, 2018.

\* cited by examiner

WRITE CACHE SYSTEM AND METHOD FOR DATA CHUNK BYPASS AND ACKNOWLEDGMENT OF WRITE OF DATA CHUNK

RELATED APPLICATION

This application is a continuation of U.S. application Ser. No. 15/398,979 filed on Jan. 5, 2017 entitled "WRITE CACHE SYSTEM AND METHOD" which claims the priority of Russia Patent Application No. 2016112119, filed on 31 Mar. 2016, the contents of which are herein incorporated by reference in its entirety.

BACKGROUND

Generally, with the increasing amounts of information being stored, it may be beneficial to efficiently store and manage that information. While there may be numerous techniques for storing and safeguarding information, each technique may have tradeoffs between reliability and efficiency.

BRIEF SUMMARY OF DISCLOSURE

In one example implementation, a method, performed by one or more computing devices, may include but is not limited to receiving, at a first computing device, a first data chunk sent from a second computing device. In certain implementations, may be determined that the first data chunk includes a first type of data. In some implementations, the first data chunk may be stored to a cache operatively coupled to the first computing device based upon, at least in part, determining that the first data chunk includes the first type of data, wherein the cache may include a first storage device type. In many implementations, an acknowledgement of a successful write of the first data chunk to the second computing device may be sent based upon, at least in part, a successful storing of the first data chunk to the cache operatively coupled to the first computing device.

One or more of the following example features may be included. In certain implementations, the first data chunk may be copied from the cache to a second storage device type operatively coupled to the first computing device. In some implementations, the first type of data may include at least one of user data and a journal entry. In many implementations, a second data chunk sent from the second computing device may be received at the first computing device. In other implementations, it may be determined that the second data chunk includes a second type of data. In certain implementations, the second data chunk may be stored to the second storage device type operatively coupled to the first computing device based upon, at least in part, determining that the second data chunk includes the second type of data, wherein the second data chunk may bypass the cache. In some implementations, an acknowledgement of a successful write of the second data chunk to the second computing device may be sent based upon, at least in part, a complete storing of the second data chunk to the second storage device type operatively coupled to the first computing device. In many implementations, s capacity used by the cache may be determined. In other implementations, a cleaning of the cache may be started based upon, at least in part, determining that the capacity used by the cache is above a first threshold. In certain implementations, cleaning of the cache may be halted based upon, at least in part, determining that the capacity used by the cache is below a second threshold.

In another example implementation, a computing system includes a processor and a memory configured to perform operations that may include but are not limited to receiving, at a first computing device, a first data chunk sent from a second computing device. It may be determined that the first data chunk includes a first type of data. In certain implementations, the first data chunk may be stored to a cache operatively coupled to the first computing device based upon, at least in part, determining that the first data chunk includes the first type of data, wherein the cache may include a first storage device type. In many implementations, an acknowledgement of a successful write of the first data chunk to the second computing device may be sent based upon, at least in part, a successful storing of the first data chunk to the cache operatively coupled to the first computing device.

One or more of the following example features may be included. In some implementations, the first data chunk may be copied from the cache to a second storage device type operatively coupled to the first computing device. In many implementations, the first type of data may include at least one of user data and a journal entry. In other implementations, second data chunk sent from the second computing device may be received at the first computing device. In certain implementations, it may be determined that the second data chunk includes a second type of data. In some implementations, the second data chunk may be stored to the second storage device type operatively coupled to the first computing device based upon, at least in part, determining that the second data chunk includes the second type of data, wherein the second data chunk may bypass the cache. In many implementations, an acknowledgement of a successful write of the second data chunk to the second computing device may be sent based upon, at least in part, a complete storing of the second data chunk to the second storage device type operatively coupled to the first computing device. In certain implementations, a capacity used by the cache may be determined. In many implementations, cleaning of the cache may be started based upon, at least in part, determining that the capacity used by the cache is above a first threshold. In some implementations, cleaning of the cache may be halted based upon, at least in part, determining that the capacity used by the cache is below a second threshold.

In another example implementation, a computer program product resides on a computer readable storage medium that has a plurality of instructions stored on it. In certain implementations, when executed by a processor, the instructions cause the processor to perform operations that may include but are not limited to receiving, at a first computing device, a first data chunk sent from a second computing device. In many implementations, it may be determined that the first data chunk includes a first type of data. In some implementations, the first data chunk may be stored to a cache operatively coupled to the first computing device based upon, at least in part, determining that the first data chunk includes the first type of data, wherein the cache may include a first storage device type. In other implementations, an acknowledgement of a successful write of the first data chunk to the second computing device may be sent based upon, at least in part, a successful storing of the first data chunk to the cache operatively coupled to the first computing device.

One or more of the following example features may be included. In certain implementations, the first data chunk may be copied from the cache to a second storage device type operatively coupled to the first computing device. In some implementations, the first type of data may include at least one of user data and a journal entry. In many implementations, a second data chunk sent from the second computing device may be received at the first computing device. In other implementations, it may be determined that the second data chunk includes a second type of data. In certain implementations, the second data chunk may be stored to the second storage device type operatively coupled to the first computing device based upon, at least in part, determining that the second data chunk includes the second type of data, wherein the second data chunk may bypass the cache. In further implementations, an acknowledgement of a successful write of the second data chunk to the second computing device may be sent based upon, at least in part, a complete storing of the second data chunk to the second storage device type operatively coupled to the first computing device. In certain implementations, a capacity used by the cache may be determined. In some implementations, a cleaning of the cache may be started based upon, at least in part, determining that the capacity used by the cache is above a first threshold. In certain implementations, the cleaning of the cache may be halted based upon, at least in part, determining that the capacity used by the cache is below a second threshold.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
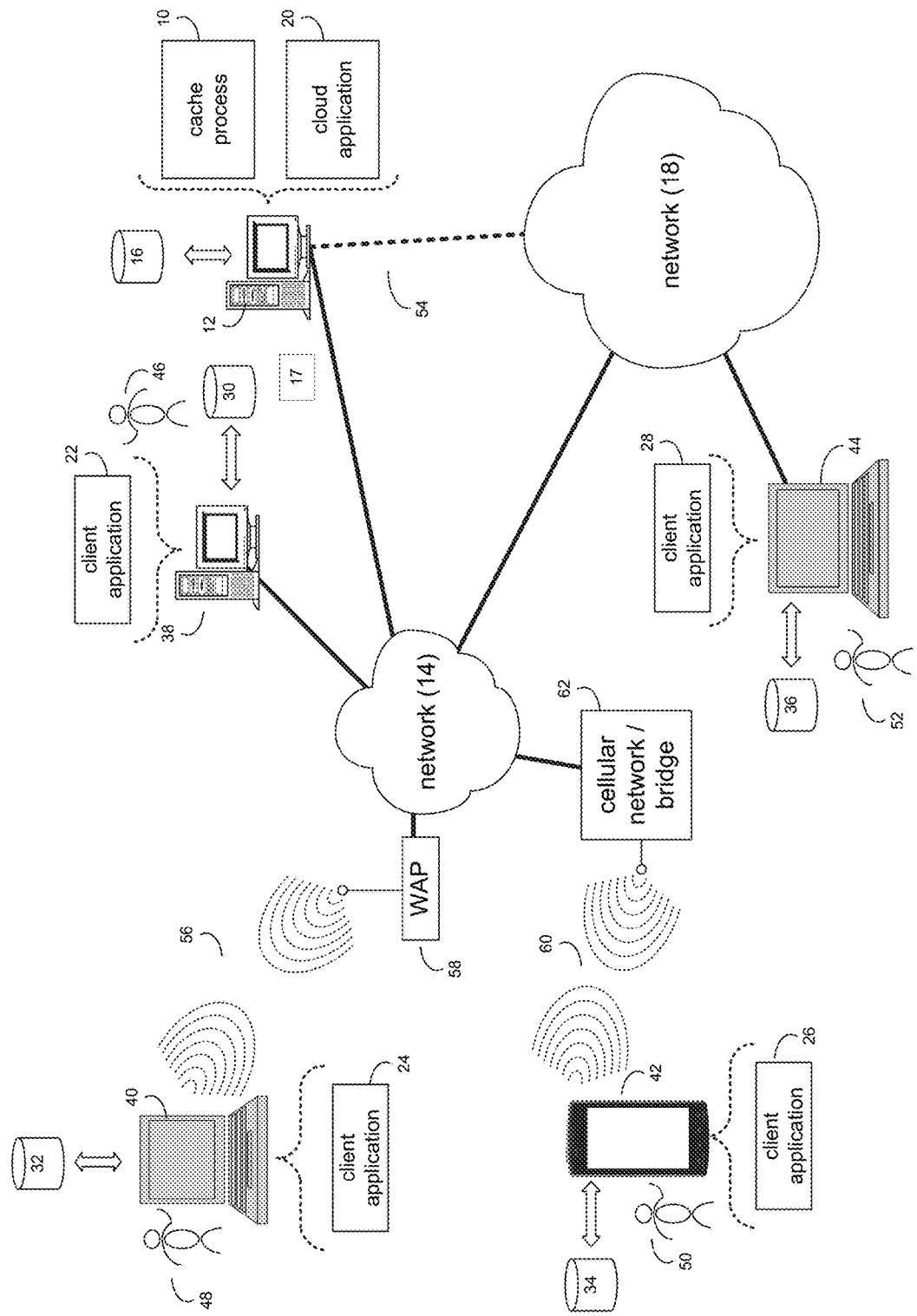
FIG. 1 is an example diagrammatic view of a cache process coupled to a distributed computing network according to one or more example implementations of the disclosure.

System Overview:

In some implementations, the present disclosure may help ensure higher performance (e.g., for write operations) in terms of duration and latency. Moreover, in some implementations, despite the fact that example implementations may be directed towards a write cache, example implementations of the present disclosure may enable faster data read operations as well.

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. The computer readable program code may be transmitted using any appropriate medium, including but not limited to the internet, wireline, optical fiber cable, RF, etc.

A computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGA), micro-controller units (MCUs), or programmable logic arrays (PLA) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. It will be understood that each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some alternative implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown GC process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Computer 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both). In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. A processor may be a virtual processor or a physical processor. Logic may be distributed across several processors or virtual processors to execute the logic.

In some implementations, as will be discussed below in greater detail, cache process 10 may receive, at a first computing device, a first data chunk sent from a second computing device. In certain implementations, it may be determined that the first data chunk includes a first type of data. In some implementations, the first data chunk may be stored to a cache operatively coupled to the first computing device based upon, at least in part, determining that the first data chunk includes the first type of data, wherein the cache may include a first storage device type. In many implementations, an acknowledgement of a successful write of the first data chunk to the second computing device may be sent based upon, at least in part, a successful storing of the first data chunk to the cache operatively coupled to the first computing device.

In some implementations, the instruction sets and subroutines of GC process 10, which may be stored on storage device 16 coupled to computer 12, may be executed by one or more processors (not shown) and one or more memory architectures (not shown) included within computer 12. In some implementations, storage device 16 may include but is not limited to: a hard disk drive; a flash drive, a tape drive; an optical drive; a RAID array (or other array); a random access memory (RAM); and a read-only memory (ROM).

In some implementations, network 14 may be connected to one or more secondary networks (e.g., network 18), examples of which may include but are not limited to: a local area network; a wide area network; or an intranet, for example.

In some implementations, computer 12 may include a data store, such as a database (e.g., relational database, object-oriented database, triplestore database, etc.) and may be located within any suitable memory location, such as storage device 16 coupled to computer 12. Any data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. The data store may also be a custom database, such as, for example, a flat file database or an XML database. Any other form(s) of a data storage structure and/or organization may also be used. In some implementations, cache process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network. An example cloud computing environment that may be used with the disclosure may include but is not limited to, e.g., Elastic Cloud Storage (ECS™) from EMC Corporation of Hopkinton, Mass. It will be appreciated that other cloud computing environments may be used without departing from the scope of the disclosure.

In some implementations, computer 12 may execute a cloud application (e.g., cloud application 20), examples of which may include, but are not limited to, e.g., a storage system application, a cloud computing application, a data synchronization application, a data migration application, or other application that allows for the implementation of highly available data in a clustered environment (or the like). In some implementations, cache process 10 and/or cloud application 20 may be accessed via client applications 22, 24, 26, 28. In some implementations, cache process 10 may be a standalone application, or may be an applet/application/script/extension that may interact with and/or be executed within cloud application 20, a component of cloud application 20, and/or one or more of client applications 22, 24, 26, 28. In some implementations, cloud application 20 may be a standalone application, or may be an applet/application/script/extension that may interact with and/or be executed within cache process 10, a component of cache process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of cache process 10 and/or cloud application 20. In some implementations, examples of client applications 22, 24, 26, 28 may include, but are not limited to, e.g., a storage system application, a cloud computing application, a data synchronization application, a data migration application, or other application that allows for the implementation of highly available data in a clustered environment (or the like), a standard and/or mobile web browser, an email application (e.g., an email client application), a textual and/or a graphical user interface, a customized web browser, a plugin, an Application Programming Interface (API), or a custom application. In some implementations, the instruction sets and subroutines of client applications 22, 24, 26, 28, which may be stored on storage devices 30, 32, 34, 36, coupled to client electronic devices 38, 40, 42, 44, may be executed by one or more processors (not shown) and one or more memory architectures (not shown) incorporated into client electronic devices 38, 40, 42, 44.

In some implementations, storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Android™, Apple® iOS®, Mac® OS X®; Red Hat® Linux®, or a custom operating system.

In some implementations, one or more of client applications 22, 24, 26, 28 may be configured to effectuate some or all of the functionality of cache process 10 (and vice versa). Accordingly, in some implementations, cache process 10 may be a purely server-side application, a purely client-side application, or a hybrid server-side/client-side application that is cooperatively executed by one or more of client applications 22, 24, 26, 28 and/or cache process 10.

In some implementations, one or more of client applications 22, 24, 26, 28 may be configured to effectuate some or all of the functionality of cloud application 20 (and vice versa). Accordingly, in some implementations, cloud application 20 may be a purely server-side application, a purely client-side application, or a hybrid server-side/client-side application that is cooperatively executed by one or more of client applications 22, 24, 26, 28 and/or cloud application 20. As one or more of client applications 22, 24, 26, 28, cache process 10, and cloud application 20, taken singly or in any combination, may effectuate some or all of the same functionality, any description of effectuating such functionality via one or more of client applications 22, 24, 26, 28, cache process 10, cloud application 20, or combination thereof, and any described interaction(s) between one or more of client applications 22, 24, 26, 28, cache process 10, cloud application 20, or combination thereof to effectuate such functionality, should be taken as an example only and not to limit the scope of the disclosure.

In some implementations, users 46, 48, 50, 52 may access computer 12 and cache process 10 (e.g., using one or more of client electronic devices 38, 40, 42, 44) directly through network 14 or through secondary network 18. Further, computer 12 may be connected to network 14 through secondary network 18, as illustrated with phantom link line 54. Cache process 10 may include one or more user interfaces, such as browsers and textual or graphical user interfaces, through which users 46, 48, 50, 52 may access cache process 10.

In some implementations, the various client electronic devices may be directly or indirectly coupled to network 14

(or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi®, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

Figure 2:
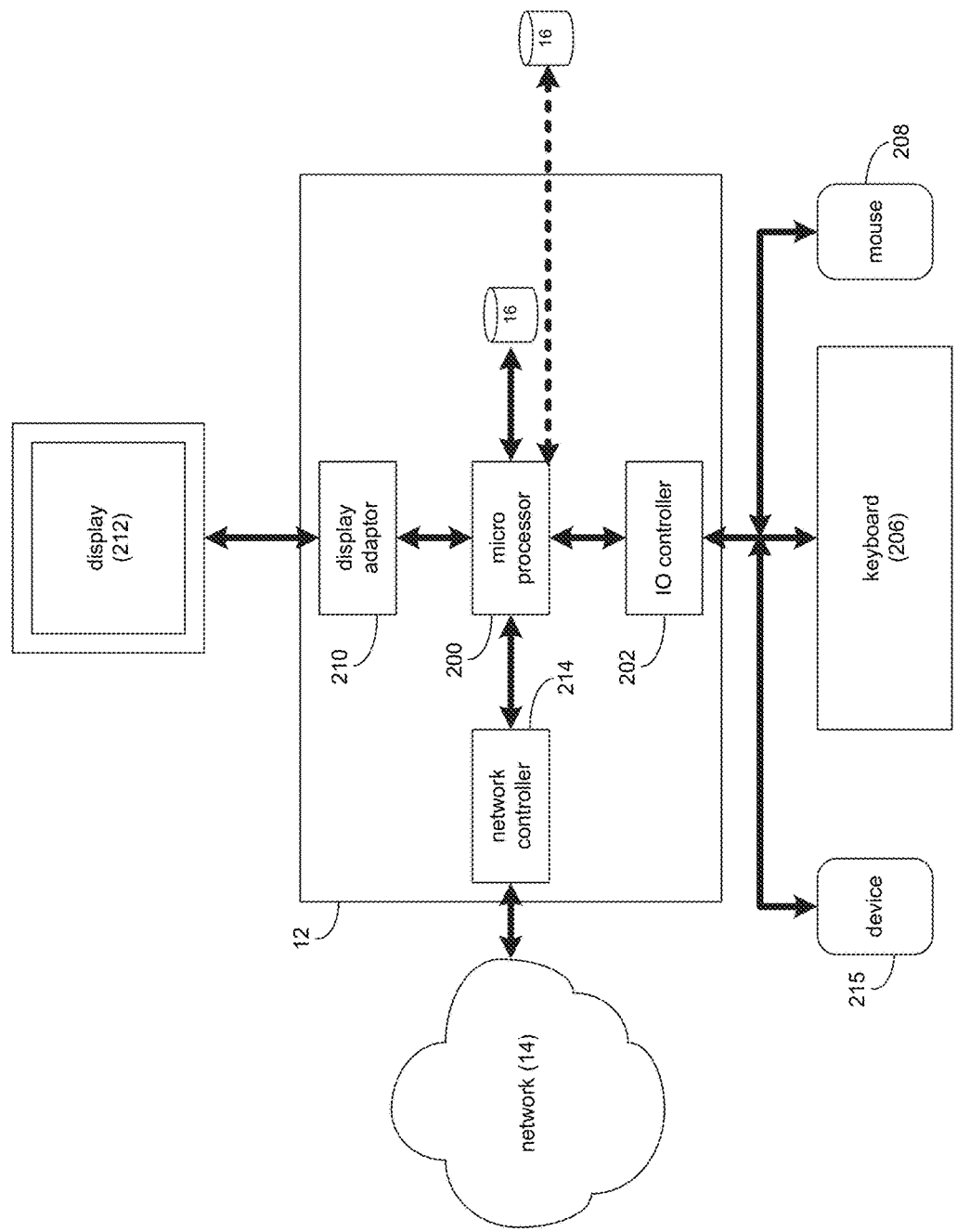
FIG. 2 is an example diagrammatic view of a client electronic device of FIG. 1 according to one or more example implementations of the disclosure.
Figure 3:
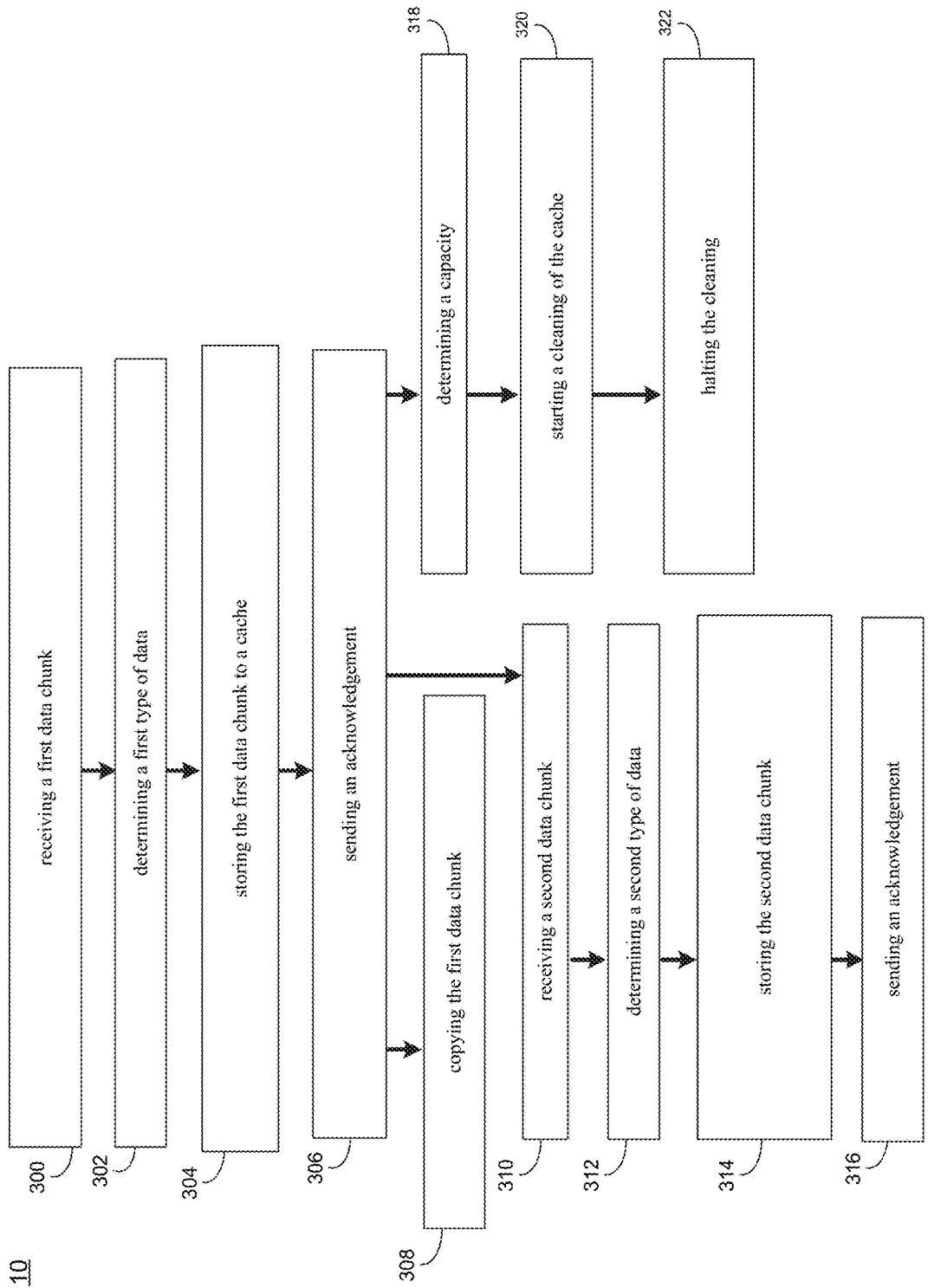
FIG. 3 is an example flowchart of the cache process of FIG. 1 according to one or more example implementations of the disclosure.

Referring also to the example implementation of FIG. 2, there is shown a diagrammatic view of computer 12. While computer 12 is shown in this figure, this is for example purposes only and is not intended to be a limitation of this disclosure, as other configurations are possible. Additionally, any computing device capable of executing, in whole or in part, CS process 10 may be substituted for computer 12 (in whole or in part) within FIG. 2, examples of which may include but are not limited to client electronic devices 38, 40, 42, 44.

In some implementations, computer 12 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device(s) (e.g., storage device 16). An I/O controller (e.g., I/O controller 202) may be configured to couple microprocessor 200 with various devices, such as keyboard 206, pointing/selecting device (e.g., touchpad, touchscreen, mouse 208, etc.), custom device (e.g., device 215), USB ports (not shown), and printer ports (not shown). A display adaptor (e.g., display adaptor 210) may be configured to couple display 212 (e.g., touchscreen monitor(s), plasma, CRT, or LCD monitor(s), etc.) with microprocessor 200, while network controller/adaptor 214 (e.g., an Ethernet adaptor) may be configured to couple microprocessor 200 to the above-noted network 14 (e.g., the Internet or a local area network).

Figure 4:
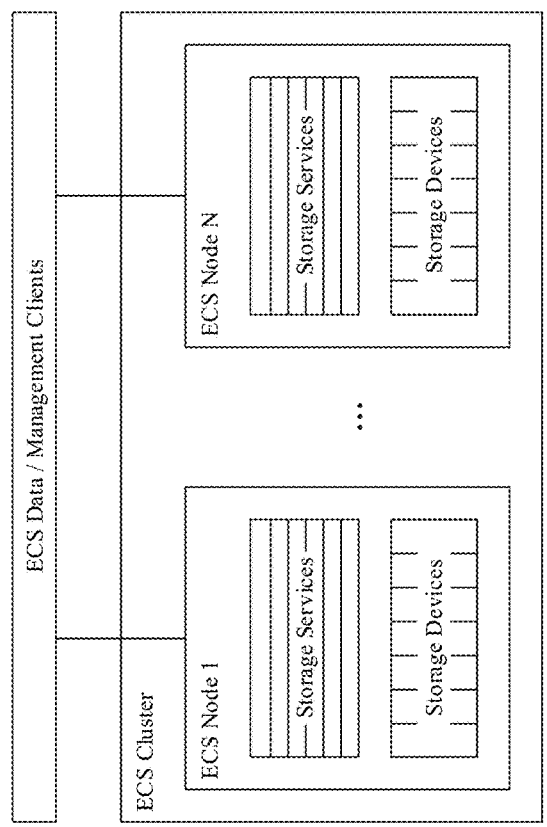
FIG. 4 is an example diagrammatic view of a high level architecture of a cluster that may be used by the cache process of FIG. 1 according to one or more example implementations of the disclosure.

In some implementations, and referring at least to the example implementation of FIG. 4, an example high level architecture of a cluster 400 is shown. In certain implementations, the cluster may be an ECS cluster. In some implementations, cluster 400 may consist of one or more storage nodes (e.g., hardware nodes). In many implementations, each storage node may manage (e.g., via cache process 10 and/or cloud application 20) several storage devices. In some implementations, the storage devices may include, e.g., hard disk drives, aka HDDs. Generally, the HDDs may be used to store user data and system metadata. In certain implementations, a single node of a cluster that runs on a hardware appliance may manage, e.g., from 15 to 60 storage devices, although more or less storage devices may also be managed. In some implementations, each node may run (e.g., via cache process 10 and/or cloud application 20) a number of services, which may together implement a storage business logic. For instance, in certain implementations, a single node may manage around 20 services, although more or less services may also be managed. In some implementations, other types of storage devices may be used without departing from the scope of the disclosure.

In some implementations, cluster technology, such as ECS, may use innovative methods for HDD capacity management. In some implementations, cluster 400 (e.g., via cache process 10 and/or cloud application 20) may sparingly rely on a file system (e.g., of cache process 10). For example, in some implementations, storage device space may be partitioned into a set of blocks of fixed size called "chunks." Generally, the information, user data and various kinds of metadata may be stored in these chunks.

In some implementations, there may be different types of chunks (e.g., one type per capacity user). For instance, in some implementations, user data may be stored in one or more "repository chunks," or just "repo chunks." As another example implementation, data replicated from a remote location may be stored in one or more "replication chunks," In some implementations, a cluster process for data regeneration may be referred to as "recovery", and may store the associated data in one or more "recovery chunks". In some implementations, cluster 400 (e.g., via cache process 10 and/or cloud application 20) may include a plurality of system processes that may minimize capacity overheads on data protection, e.g., Erasure Coding (EC) and XOR upon replicated data, which may store associated data in one or more "EC chunks" and "XOR chunks". In some implementations, the metadata may be stored in a tree-like structure, where the trees may be stored in one or more "tree chunks". In certain implementations, tree journals may be stored in one or more "journal chunks."

Figure 5:
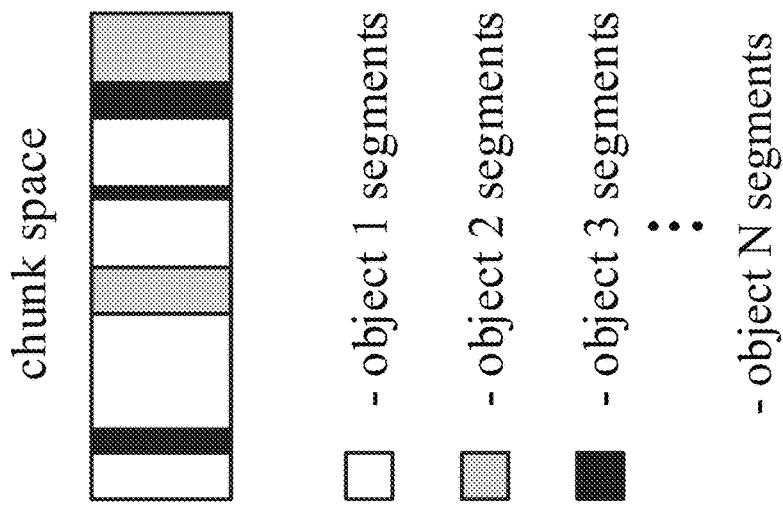
FIG. 5 is an example diagrammatic view of a data chunk according to one or more example implementations of the disclosure.
Figure 6:
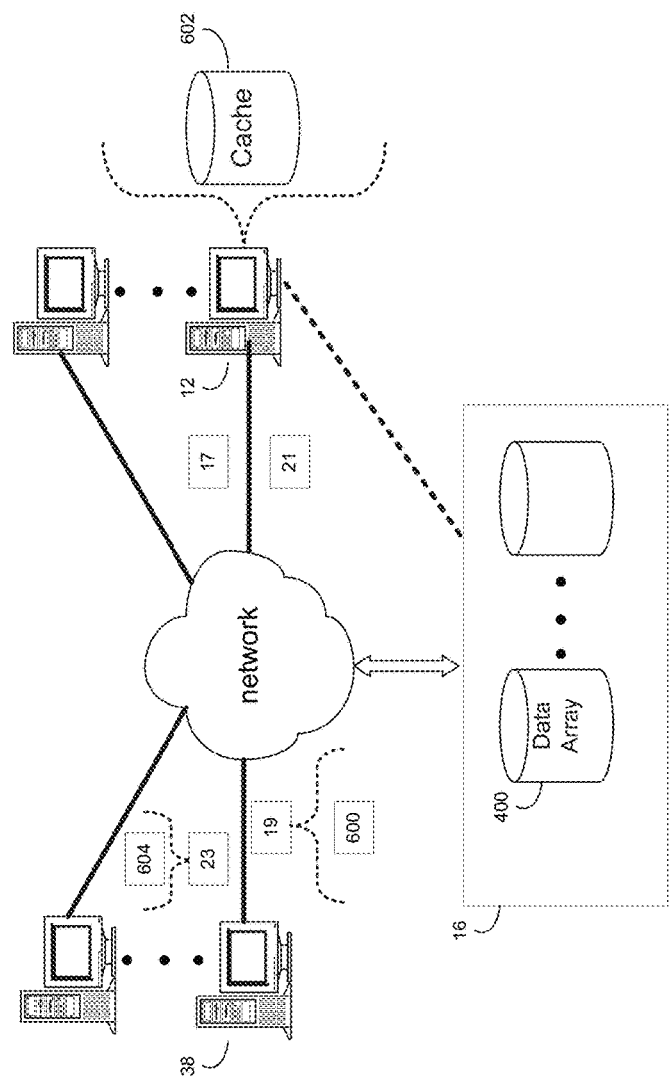
FIG. 6 is an example diagrammatic view of the cache process coupled to a cache and data array according to one or more example implementations of the disclosure.

In some implementations, and referring at least to the example implementation of FIG. 5, an example layout of a repo chunk (e.g., repo chunk 500) is shown. In some implementations, chunks of each type may be shared. For instance, in some implementations, one repo chunk may contain fragments of several user objects. For example, as can be seen from the example implementation of FIG. 5, a single repo chunk may include mixed segments of one or more user objects (e.g., object 1, object 2, object 3, etc.). In some implementations, there may be a number of storage services that may work with HDDs and chunks. For instance, the example embodiment of FIG. 5 cache process 10 and/or cloud application 20 may include a storage chunk management service that may facilitate storage chunk allocation/reclamation, protection via EC, Geo replication, etc. In some implementations, cache process 10 and/or cloud application 20 may include a storage (server) management service that may manage available storage devices capacity and track storage device states. In some implementations, cache process 10 and/or cloud application 20 may include a storage (server) service that may interface with the storage devices.

In certain implementations, cluster storage, such as ECS, may be considered as reliable storage. For example, in some implementations during data writes, acknowledgements are typically not sent to a cluster client until the data and corresponding system metadata journal entries are synchronized to HDD. As will be discussed in greater detail below, in some implementations, cache process 10 may help improve cluster performance via using, e.g., a SSD-based (Solid-State Drive) write cache. For example, one or more storage nodes may be complemented with one or more SSDs as a write cache mechanism that may, in some implementations, take into account one or more of the example features of ECS (or similar) architecture described above.

In some implementations, while a cluster may be described throughout, the cluster may be an ECS cluster or other example non-ECS architectures/features (and/or non-clustered systems). Any type of cluster may be used without departing from the scope of the disclosure. As such, the description of ECS should be taken as example only and not to otherwise limit the scope of the disclosure.

The Cache Process:

As discussed above and referring also at least to the example implementations of FIGS. 3 and 6-8, cache process 10 may receive 300, at a first computing device, a first data chunk sent from a second computing device. Cache process 10 may determine 302 that the first data chunk includes a first type of data. Cache process 10 may store 304 the first data chunk to a cache operatively coupled to the first computing device based upon, at least in part, determining 302 that the first data chunk includes the first type of data, wherein the cache may include a first storage device type. Cache process 10 may send 306 an acknowledgement of a successful write of the first data chunk to the second computing device based upon, at least in part, a successful storing 304 of the first data chunk to the cache operatively coupled to the first computing device.

In some implementations, cache process 10 may receive 300, at a first computing device, a first data chunk sent from a second computing device. For instance, assume for example purposes only that a client electronic device (e.g., client electronic device 38) sends an Input/Output (I/O) request (e.g., write request 19) to store data of write request 19 to data array 400. Further assume for example purposes only that the data of write request 19 includes a data chunk (e.g., chunk 600). In the example, write request 19 (and the associated chunk 600) may be received 300 by, e.g., computer 12. In certain implementations, client electronic device 38 may send the data (e.g., block/file/object, etc.) to cache process 10, e.g., at computer 12. Thus, in some implementations, cache process 10 may pack this data into chunks, as client electronic device 38 may not be aware of chunks. Accordingly, in certain implementations, cache process 10 receiving 300 a data chunk need not imply that the data is in chunk form as the data is sent from client electronic device 38 and before being received 300 by cache process 10.

In some implementations, cache process 10 may determine 302 that the first data chunk (e.g., chunk 600) includes a first type of data. For instance, in some implementations, the data client may not be aware that cache process 10 maintains data in chunks. For example, in some implementations, an application (e.g., of cache process 10, cloud application 20, etc.) may create a new data object (or file, or block, etc.) within ECS. In some implementations, the application may use an API (e.g., Centera SDK, OpenStack Swift, Amazon S3, etc.) and may send to cache process 10 the object content and (optionally) some user metadata (e.g., comment, description, tag, etc.). In some implementations, cache process 10 may reuse an existing repo chunk(s) or creates a new one(s) to store the object content. In many implementations, a chunk ID(s) may be a part of system metadata for the object. In some implementations, the metadata (e.g., user, system, and API-specific) may be stored in search trees. However, in some implementations, for the beginning, cache process 10 may save the metadata in a journal chunk(s) (existing or new).

In some implementations, the first type of data may include at least one of user data and a journal entry. For example in certain implementations, user data may be content of a block/file/object received from a client application (e.g., client application 22). In many implementations, search trees used to keep the metadata may be large. In some implementations, tree updates may be very expensive on resources. Thus, in some implementations, journals (e.g., tree journals) may be used. In some implementations, there may be a journal per search tree. In some implementations, when a journal contains enough information, a bulk update may be applied to the corresponding tree. In certain implementations, journals may contain tree modification requests of the following example types: (1) Create a key, e.g. an object ID, with a value, e.g., the metadata associated with the object; (2) Update value for a key after some event, e.g., the application sent new metadata; (3) Delete a key.

In some implementations, cache process 10 may store 304 the first data chunk to a cache operatively coupled to the first computing device based upon, at least in part, determining 302 that the first data chunk includes the first type of data, wherein the cache may include a first storage device type. For instance, in some implementations, assume for example purposes only that cache process 10 determines 302 that chunk 600 received 300 at computer 12 via client computing device 38 includes user data and/or a journal entry. In some implementations, cache process 10 may store 304 chunk 600 to a cache (e.g., cache 602) operatively coupled to computer 12 based upon, at least in part, determining 302 that chunk 600 includes user data and/or a journal entry. In some implementations, as will be discussed in great detail below, cache 602 may include a solid state device (SSD) as the storage device type. In other implementations, other examples of storage device types may be used without departing from the scope of the disclosure.

In some implementations, cache process 10 may send 306 an acknowledgement of a successful write of the first data chunk to the second computing device based upon, at least in part, a successful storing 304 of the first data chunk to the cache operatively coupled to the first computing device. For instance, generally, e.g., with clustered systems that may run on a hardware appliance such as computer 12, the clustered system may not send an acknowledgement to its client (e.g., client electronic device 38) until "critical information" (e.g., user data and/or metadata (stored in a journal in the form of one or more journal entries) associated with the write request) is synchronized to a relatively slow data array (e.g., data array 400), which may include a hard disk drive (HDD). As noted above in certain implementations, cache 602 may include a SSD, which may be another type of non-volatile memory with better performance characteristics. In some implementations, with having one or more SSDs included with cache 602 for computer 12, cache process 10 may enable acknowledgement of a successful data write to be sent 306 after the "critical information" is synchronized to cache 602. Thus, in some implementations, cache process 10 may enable the reduction of write operation duration (e.g., the time needed to perform the write operation for chunk 600, and/or may reduce write operation latency, a.k.a., response time, (e.g., the time between the moment the last byte of the write request is sent from client electronic device 38 and the moment the first byte of the acknowledgement response is received by client electronic device 38). Therefore, in some implementations, cache process 10 may send 306 an acknowledgement message (e.g., acknowledgement message 17) to client electronic device 38 upon the successful storing 304 of chunk 600 in cache 602, which may be faster than waiting for chunk 600 to be stored at data array 400 before sending an acknowledgement message.

In some implementations, cache process 10 may copy 308 the first data chunk from the cache to a second storage device type operatively coupled to the first computing device. For instance, in certain implementations, assume for example purposes only that cache process 10 has successfully stored 304 chunk 600 in cache 602 (and/or sent 306 acknowledgement message 17 to client electronic device 38). In many example implementations, at some later time, information stored 304 to cache 602 (e.g., the stored 304 user data and/or a journal entry) may be copied 308 to data array 400 (e.g., via the slower HDD storage device type). In certain implementations, this may release cache space for serving further write requests.

In some implementations, a second data chunk sent from the second computing device may be received 310 by cache process 10 at the first computing device. For instance, assume for example purposes in certain implementations that a client electronic device (e.g., client electronic device 38) sends an Input/Output (I/O) request (e.g., write request 23) to store data of write request 23 to data array 400. Further assume for example purposes in those certain implementations that the data of write request 23 includes a data chunk (e.g., chunk 604). In these certain implementations, write request 23 (and the associated chunk 604) may be received 310 by, e.g., computer 12.

In some implementations, cache process 10 may determine 312 that the second data chunk includes a second type of data. For instance, in certain implementations, similarly to how cache process 10 may determine 302 that chunk 600 includes user data and/or a journal entry, cache process 10 may determine 312 that chunk 604 includes a second type of data (e.g., any types of data other than user data and/or a journal entry). In some implementations, cache process 10 may store 314 the second data chunk to the second storage device type operatively coupled to the first computing device based upon, at least in part, determining 312 that the second data chunk includes the second type of data, wherein the second data chunk may bypass the cache. For instance, assume for example purposes in some implementations that cache process 10 determines 312 that chunk 604 received 310 at computer 12 via client computing device 38 does not include user data and/or a journal entry. In some implementations, cache process 10 may store 314 chunk 604 to data array 400 operatively coupled to computer 12 based upon, at least in part, determining 312 that chunk 604 does not include user data and/or a journal entry. For example, in certain implementations while the SSD may be faster than the HDD, the total capacity of the SSD may be relatively smaller compared to the total capacity of the HHD. Therefore, in some implementations, only data determined by cache process 10 as being required to be stored during write operations (e.g., user data and/or journal entries that may contain "critical" system metadata that describes user data stored) may be considered as a candidate for caching. In some implementations, other data types (e.g., non-user data and/or non-journal entries) may bypass being stored at cache 602 and go "directly" to the HDD of data array 400. In some implementations, (e.g., for a full write cache), the data types listed above may be directed to the HDD of data array 400 as well. In some implementations, however, the total SSD capacity of cache 602 may be required to be large enough to accommodate open for write chunks.

In some implementations, cache process 10 may send 316 an acknowledgement of a successful write of the second data chunk to the second computing device based upon, at least in part, a complete storing 314 of the second data chunk to the second storage device type operatively coupled to the first computing device. For instance, assume for example purposes in certain implementations that cache process 10 stores 314 chunk 604 to data array 400 operatively coupled to computer 12 based upon, at least in part, determining 312 that chunk 604 does not include user data and/or a journal entry. In some implementations, cache process 10 may enable acknowledgement (e.g., acknowledgement message 21) of a successful data write to be sent 316 to client electronic device 38 after the successful storing 314 of chunk 604 to the HDD of data array 400.

In some implementations, as noted above, the write cache (e.g., cache 602) may work with the supported data types at the chunk level. Thus, in some implementations, cache process 10 may store, e.g., repo chunks and journal chunks. In some implementations, cache 602 may be required to contain either the entire chunk content or nothing. In some implementations, cache process 10 may render it impossible to have some part of chunk content (e.g., chunk 600) in cache 602 only, while some other part of chunk content (e.g., chunk 600) is stored in data array 400 only. In some implementations, cache process 10 may enable it such that some part of chunk content (e.g., chunk 600) stored in cache 602 dumped to data array 400 as well, though.

In some implementations, when a new chunk starts accepting data (e.g., via cache process 10), it may be cached if there is enough free space in cache 602 to accommodate the entire chunk. Otherwise, in some implementations, the incoming data traffic for this chunk may be directed to data array 400. In some implementations, when some existing chunk continues accepting data (e.g., via cache process 10), it may be cached if the chunk is already in cache 602. Otherwise, in some implementations, cache process 10 may prevent the chunk from being cached at cache 602.

In some implementations, there may be, e.g., at least two example reasons why a chunk may be out of cache 602: (1) the chunk traffic was directed to data array 400 from the very beginning (e.g., from client electronic device 38), and/or (2) the chunk was pre-empted from cache 602. Thus, in some implementations, the examples described above may result in the following: if some chunk is cached, then cache 602 may contain the up-to-date chunk version. Therefore, in certain implementations cache 602 may be used to read data (e.g., via cache process 10) from the chunks it contains without any access to data array 400. In some implementations, when a determination 302 is made (e.g., via cache process 10) that some chunk may be stored 304 in cache 602 (as noted above), the capacity necessary to store 304 the entire chunk may be reserved (e.g., via cache process 10) in cache 602.

In some implementations, cache process 10 may enable faster reading from the chunk via cache 602. For example, in certain implementations, use cases for reading may include, e.g., user data reading by a storage client, chunk content protection via EC, chunk Geo replication, journal processing, etc. Therefore, in some implementations, cache 602 (via cache process 10) may increase read operation performance and overall performance of the cluster.

Figure 7:
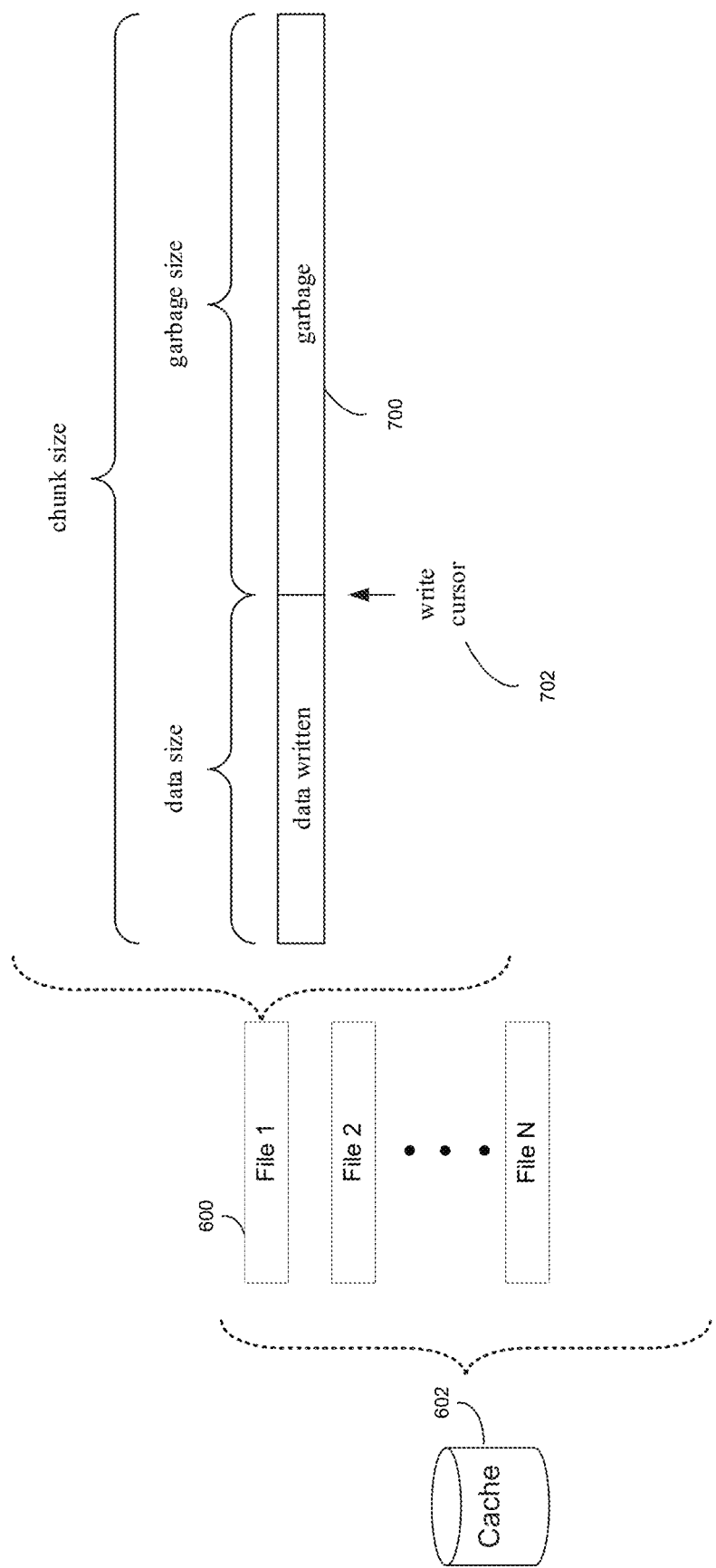
FIG. 7 is an example diagrammatic view of a physical layout point of view of a chunk cache file according to one or more example implementations of the disclosure.

In some implementations, and referring at least to FIG. 7, an example of the physical layout point of view of a chunk (e.g., chunk 600) cache file in cache 602 is shown. In some implementations, cache 602 may include a set of one or more files, where each file may include a single chunk. In some implementations, e.g., to minimize the number of I/O operations and reduce file system fragmentation, cache process 10 may create cache files of chunk size, which may indicate that a cache file may include some garbage at the end (e.g., garbage 700). In some implementations, the cache file may have a size that is equal to the size of the chunk for which it was created. In some implementations, the first part of the file may be filled with data already written. In some implementations, the second part of the file may include garbage 700. In some implementations, a write cursor (e.g., write cursor 702) may point to the first byte of garbage 700.

Figure 8:
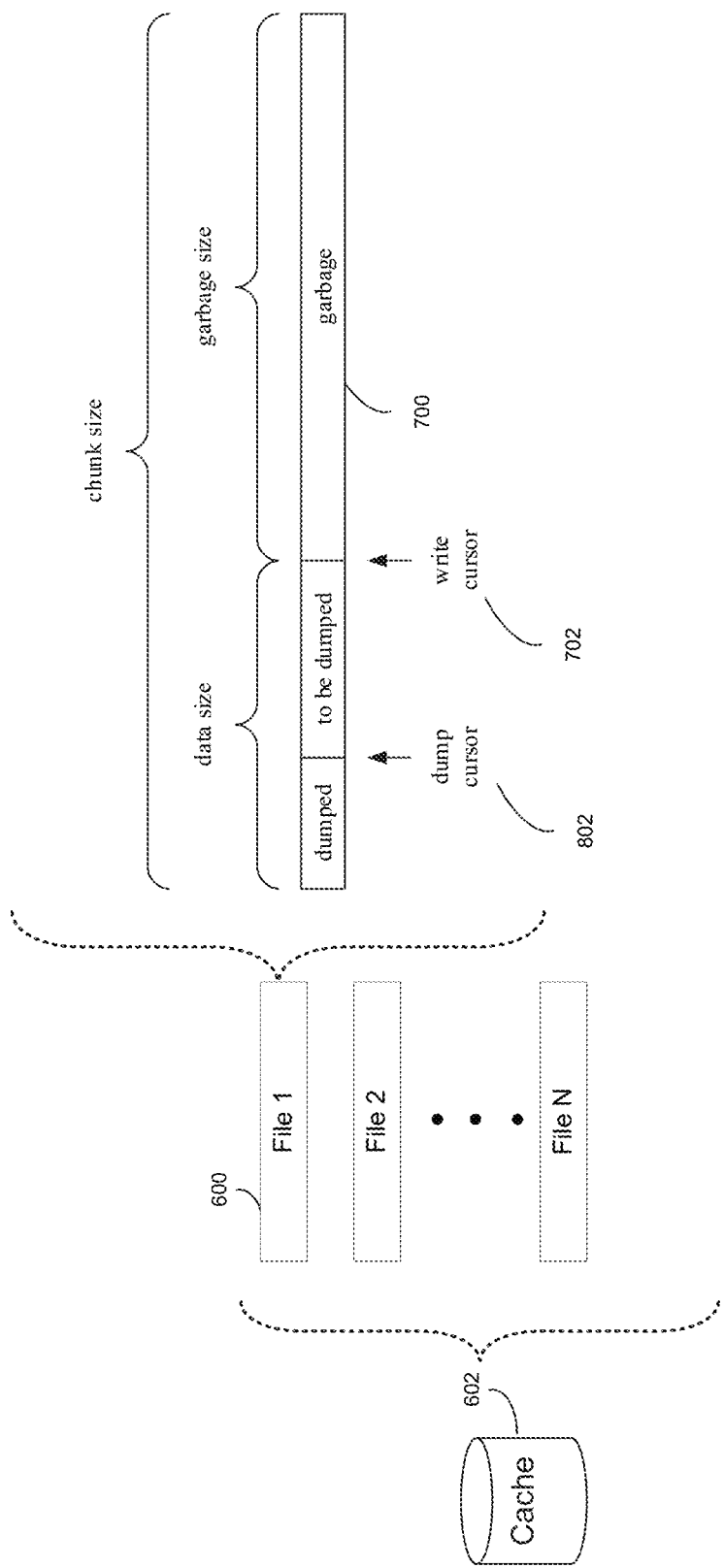
FIG. 8 is an example diagrammatic view of a physical layout point of view of a chunk cache file according to one or more example implementations of the disclosure.

In some implementations, and referring at least to FIG. 8, an example of the physical layout point of view of a chunk (e.g., chunk 600) cache file in cache 602 regarding an example dump policy is shown. In some implementations, cached data may be dumped (e.g., via cache process 10) to data array 400 in background and/or in parallel with data writing to cache 602. In some implementations, apart from write cursor 702, each cache file may also include a dump cursor (e.g., dump cursor 802). In certain implementations, dump cursor 802 may point to the first byte of chunk 600 that has not yet been dumped to data array 400 or the first byte of garbage 700. In some implementations, e.g., in case of an empty cache file, dump cursor 802 and write cursor 702 may line up, as they may both point to the first byte of the file. In some implementations, when write cursor 702 is ahead of dump cursor 802, the cache file may be considered by cache process 10 as a candidate for dumping. In some implementations, only a byte range between dump cursor 802 and write cursor 702 may be the subject for dumping. In certain example implementations, once a byte range is dumped by cache process 10, dump cursor 802 may be set by cache process 10 to the value that write cursor 702 had at the moment the dump started. In some implementations, write cursor 702 may advance during data dump, since, e.g., dumps and writes may run in parallel.

In some implementations, the dumping process of cache process 10 may sort file candidates by modification time. For example, in certain implementations, a cache file with the oldest modification time may be handled first for dumping. In some implementations, this approach may help ensure that, e.g., cached data is dumped sooner or later, under severe load cache 602 may accumulate several data writes to be dumped in one go, which may enable the achievement of higher data array bandwidth, as storing N+M bytes in one go may be faster than two consecutive writes of N and M bytes. In some implementations, the dumping process of cache process 10 may take into account the fact that each node may manage multiple data arrays. In some implementations, there may be several dumping threads that may run within a particular dumping process. In certain implementations, these threads may perform parallel data dumping to different data arrays (and/or HDDs in the same data array) to achieve a higher bandwidth for writing. In some implementations, a dumping thread may be created per local HDD in data array 400.

In some implementations, cache process 10 may determine 318 a capacity used by the cache. For example, in some implementations, cache process 10 may determine 318 the currently used capacity of cache 602. For instance, assume for example purposes only that 40% of cache 602 is available. In the example, cache process 10 may determine 318 the currently used capacity of cache 602 as 60%.

In some implementations, cache process 10 may start 320 a cleaning of the cache based upon, at least in part, determining 318 that the capacity used by the cache is above a first threshold, and cache process 10 may halt 322 the cleaning of the cache based upon, at least in part, determining 318 that the capacity used by the cache is below a second threshold. For example, in some implementations, a cleaning process of cache process 10 may delete files from cache 602. In certain implementations, a cache cleanup policy may pursue two example goals, which in some ways may conflict with each other: (1) assure there is always some free space in cache 302 for new chunks, and (2) allow files to stay in cache 602 as long as it is possible in order to make chunks available for relatively fast reading. For example, in some implementations, when used cache capacity is determined 318 to be above the first (e.g., high) threshold, the cleaning process of cache process 10 may start 320 deleting chunk files from cache 602. In some implementations, when used cache capacity is determined 318 to be below the second (e.g., low) threshold, the cleaning process of cache process 10 may halt 322 deleting chunk files. Thus, in some implementations, cache process 10 may maintain used cache capacity between low and high thresholds.

In some implementations, the cleaning process of cache process 10 may ignore cache files which are candidates for dumping. That is, in some implementations, only cache file with all its content dumped to data array 400 may be considered by cache process 10 as a candidate for cleanup. In some implementations, this may help achieve high write cache performance while keeping a "simpler" logic, such that the dumpling process and the cleaning process do not interfere with each other.

In some implementations, cache process 10 may identify whether a chunk is open for writing. In certain implementations, if some chunk is open for writing (e.g., as determined by cache process 10), cache process 10 may ensure that the chunk stays in the cache. In many implementations, sealed chunks (e.g., chunks that stop accepting new data), may be the first candidates for the cleaning process. In some implementations, the cleaning process may sort sealed chunks' files-candidates by access (e.g., read or write) time. In some implementations, cache files with the oldest access time may be handled first. In certain implementations, this approach may help to ensure that hot data stays in cache 602 as long as possible. In some implementations, if there are no sealed chunks available for cleanup, the cleaning process may handle other cache file using the same approach, where file candidates with the oldest access time may be deleted first.

In some implementation, cache process 10 may help ensure high write operations performance for systems where, e.g., incoming traffic may be lower than data array 400 (e.g., HDD data array) bandwidth available for writing. In this example implementation, write operations may be served by write cache 602 via cache process 10. In some implementation, e.g., for systems with a higher traffic, cache 602 may promote higher system performance via more efficient writes to data array 400.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
   receiving, at a first computing device, a data chunk sent from a second computing device;
   determining whether the data chunk includes one of a first type of data and a second type of data;
   in response to determining that the data chunk includes the first type of data:
      storing the data chunk in a cache operatively coupled to the first computing device, wherein the cache includes a first storage device type,
      sending an acknowledgement of a successful write of the data chunk based upon, at least in part, a successful storing of the data chunk in the cache, and
      copying the data chunk from the cache to a second storage device type;
   in response to determining that the data chunk includes the second type of data:
      storing the data chunk in the second storage device type, wherein the data chunk bypasses the cache, and
      sending an acknowledgement of a successful write of the data chunk based upon, at least in part, a complete storing of the data chunk in the second storage device.

2. The computer-implemented method of claim 1 wherein the first type of data includes at least one of user data and a journal entry.

3. The computer-implemented method of claim 1 further comprising determining a capacity used by the cache.

4. The computer-implemented method of claim 3 further comprising starting a cleaning of the cache based upon, at least in part, determining that the capacity used by the cache is above a first threshold.

5. The computer-implemented method of claim 4 further comprising halting the cleaning of the cache based upon, at least in part, determining that the capacity used by the cache is below a second threshold.

6. The computer-implemented method of claim 4 further comprising dumping one or more cache files stored within the cache.

7. The computer-implemented method of claim 6 further comprising cleaning the one or more cache files from the cache in response to dumping the one or more cache files stored within the cache.

8. A computer program product residing on a non-transitory computer readable storage medium having a plurality of instructions stored thereon which, when executed by a processor, cause the processor to perform operations comprising:
   receiving, at a first computing device, a data chunk from a second computing device;
   determining whether the data chunk includes one of a first type of data and a second type of data;
   in response to determining that the data chunk includes the first type of data:
      storing the data chunk in a cache operatively coupled to the first computing device, wherein the cache includes a first storage device type,
      sending an acknowledgement of a successful write of the data chunk based upon, at least in part, a successful storing of the data chunk to the cache, and
      copying the data chunk from the cache to a second storage device type;
   in response to determining that the data chunk includes the second type of data:
      storing the data chunk in the second storage device type, wherein the data chunk bypasses the cache, and
      sending an acknowledgement of a successful write of the data chunk based upon, at least in part, a complete storing of the data chunk in the second storage device.

9. The computer program product of claim 8 wherein the first type of data includes at least one of user data and a journal entry.

10. The computer program product of claim 8 further comprising determining a capacity used by the cache.

11. The computer program product of claim 10 further comprising starting a cleaning of the cache based upon, at least in part, determining that the capacity used by the cache is above a first threshold.

12. The computer program product of claim 11 further comprising halting the cleaning of the cache based upon, at least in part, determining that the capacity used by the cache is below a second threshold.

13. The computer program product of claim 11 further comprising dumping one or more cache files stored within the cache.

14. The computer program product of claim 13 further comprising cleaning the one or more cache files from the cache in response to dumping the one or more cache files stored within the cache.

15. A computing system including a processor and a memory configured to perform operations comprising:
   receiving, at a first computing device, a first data chunk sent from a second computing device;
   determining whether the data chunk includes one of a first type of data and a second type of data;
   in response to determining that the data chunk includes the first type of data:
      storing the data chunk to a cache operatively coupled to the first computing device, wherein the cache includes a first storage device type, sending an acknowledgement of a successful write of the data chunk to the second computing device based upon, at least in part, a successful storing of the data chunk to the cache, and copying the data chunk from the cache to a second storage device type;

in response to determining that the data chunk includes the second type of data:

storing the data chunk in the second storage device type, wherein the data chunk bypasses the cache, and sending an acknowledgement of a successful write of the data chunk based upon, at least in part, a complete storing of the data chunk in the second storage device.

16. The computing system of claim 15 wherein the first type of data includes at least one of user data and a journal entry.

17. The computing system of claim 15 further comprising determining a capacity used by the cache.

18. The computing system of claim 17 further comprising starting a cleaning of the cache based upon, at least in part, determining that the capacity used by the cache is above a first threshold.

19. The computing system of claim 17 further comprising dumping one or more cache files stored within the cache.

20. The computing system of claim 19 further comprising cleaning the one or more cache files from the cache in response to dumping the one or more cache files stored within the cache.

* * * * *